Dec. 18, 1923.　　　　　　　　　　　　　　　　1,478,358
B. E. CRAIN
FOLDING BED FOR VEHICLES
Filed Dec. 17, 1921　　　3 Sheets-Sheet 1

B. E. Crain, INVENTOR

BY Victor J. Evans, ATTORNEY

WITNESS:

Dec. 18, 1923.                                                    1,478,358
                          B. E. CRAIN
                   FOLDING BED FOR VEHICLES
                   Filed Dec. 17, 1921         3 Sheets-Sheet 2
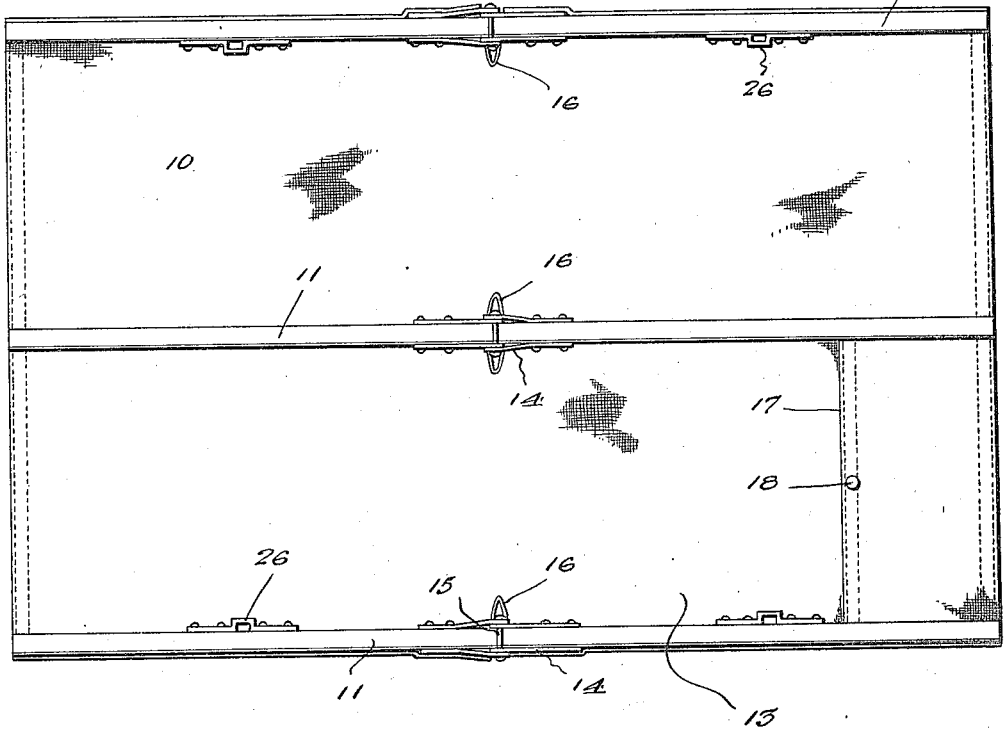
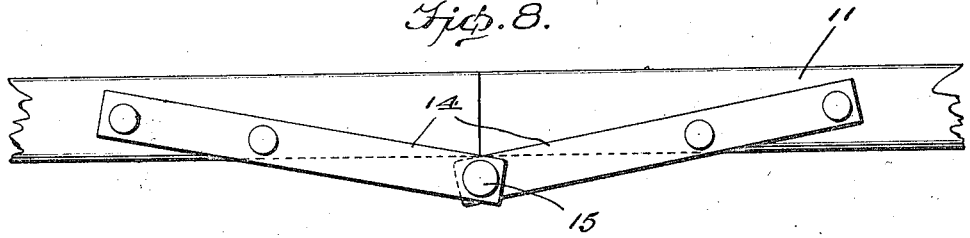
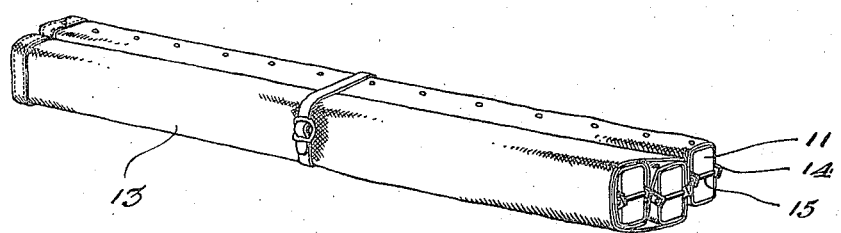
B. E. Crain
INVENTOR
BY
ATTORNEY
WITNESS:

Dec. 18, 1923.
B. E. CRAIN
1,478,358
FOLDING BED FOR VEHICLES
Filed Dec. 17, 1921
3 Sheets-Sheet 3
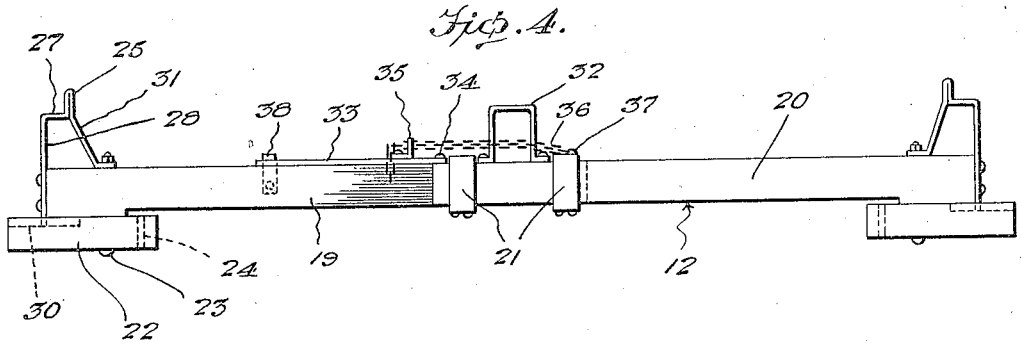
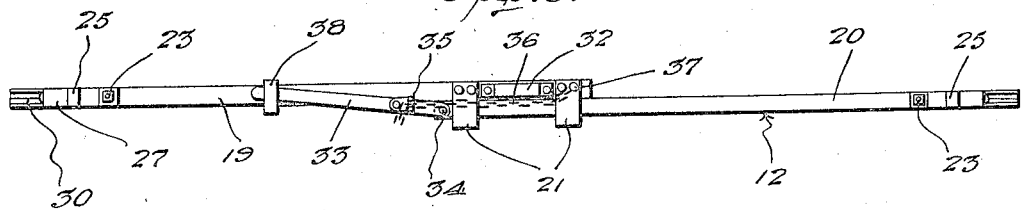
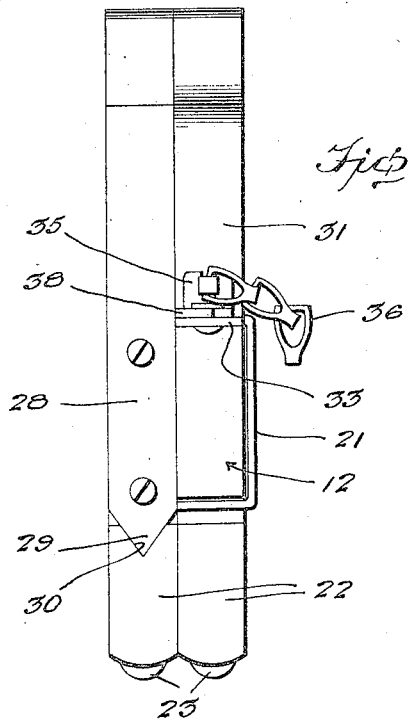
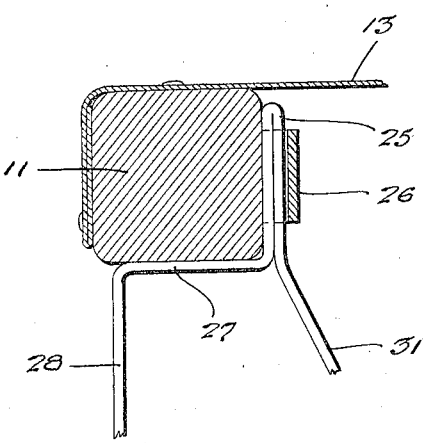
B. E. Crain INVENTOR
BY Victor J. Evans ATTORNEY
WITNESS:

Patented Dec. 18, 1923.

1,478,358

UNITED STATES PATENT OFFICE.

BURTON E. CRAIN, OF SPRINGFIELD, MISSOURI, ASSIGNOR OF ONE-HALF TO FRANK W. CRAIN, OF SPRINGFIELD, MISSOURI.

FOLDING BED FOR VEHICLES.

Application filed December 17, 1921. Serial No. 523,114.

*To all whom it may concern:*

Be it known that I, BURTON E. CRAIN, a citizen of the United States, residing at Springfield, in the county of Greene and State of Missouri, have invented new and useful Improvements in Folding Beds for Vehicles, of which the following is a specification.

This invention relates to beds or cots and has for an object the provision of a bed whose structure is such as to permit of its use within the body of an automobile, or it may be used as a bed or cot upon the outside of the vehicle.

Another object is the provision of a bed of this character which is of knock down construction, the parts being so made that it may be folded and packed in a relatively small space for convenience in transportation.

Another object of the invention is a bed of this character which may be used within automobiles of different sizes, the construction being such as to permit passage of the steering wheel of a small car through the bed, so that the steering wheel will not interfere with its use.

A further object of the invention is the provision of a bed of this character which may be easily and quickly set up in a strong and secure manner, but may also be easily and quickly disassembled and folded for storage.

With the above and other objects in view, the invention further includes the following novel features and details of construction, to be hereinafter more fully described, illustrated in the accompanying drawings and pointed out in the appended claims.

In the drawings:—

Figure 3 is a bottom plan view of the bed.

Figure 4 is an enlarged elevation of one of the extensible cross bars.

Figure 5 is a plan view of the same.

Figure 6 is an end view.

Figure 7 is a detail sectional view showing the means of connection between the side bars and cross bars.

Figure 8 is an enlarged edge view of the joint of one of the side bars.

Figure 9 is a view showing the bed folded.

Figure 1:
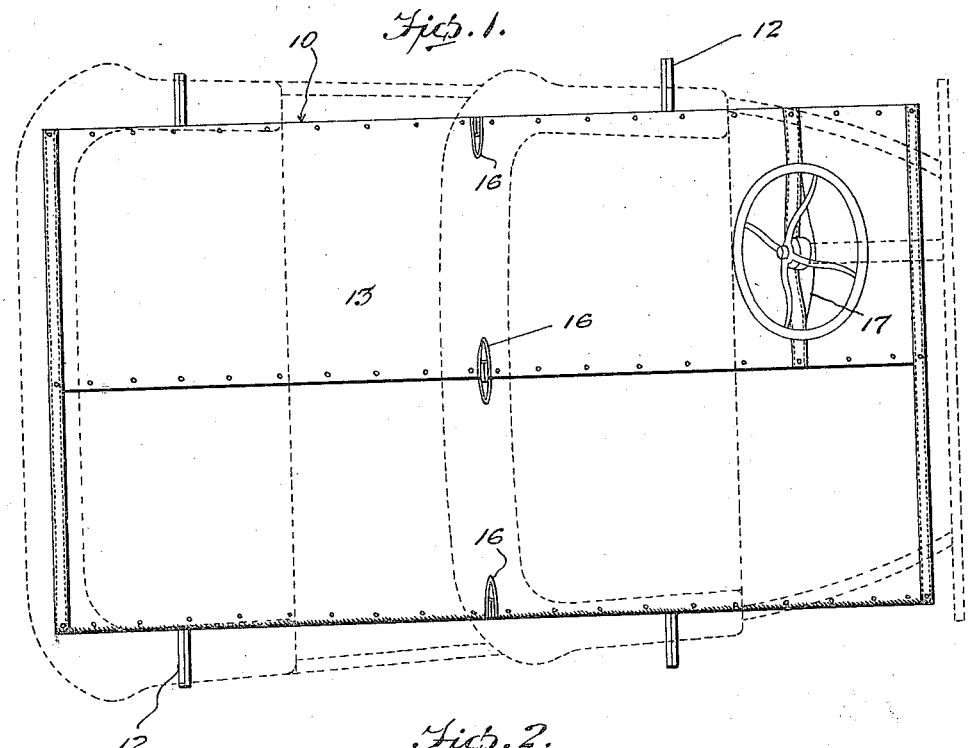
Figure 1 is a plan view of the bed in extended position showing the body of an automobile by dotted lines.
Figure 2:
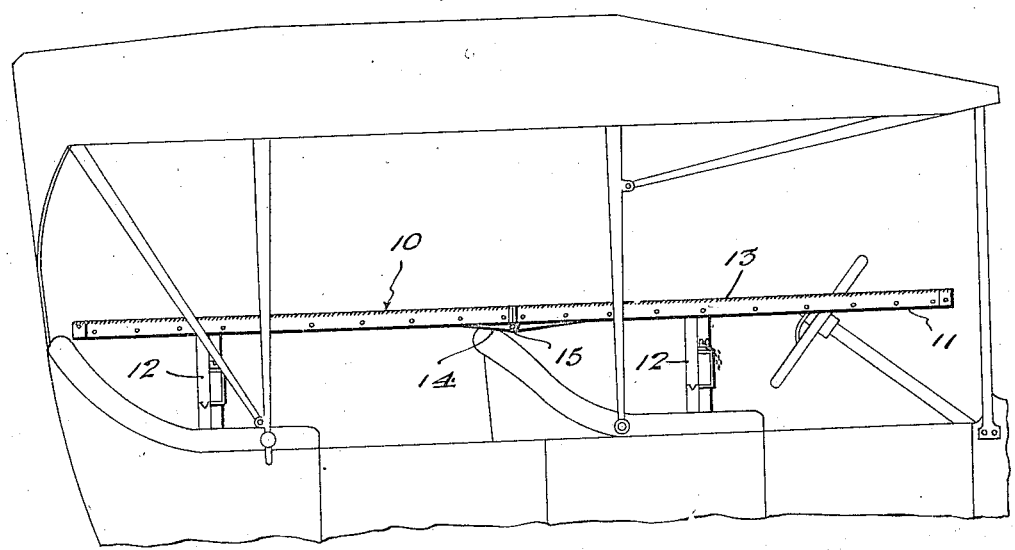
Figure 2 is a side elevation of a portion of an automobile showing the bed in position for use.

Referring in detail to the drawings, wherein like characters of reference denote corresponding parts, the reference character 10 indicates the bed which includes longitudinal bars 11 and transverse bars 12, which provide a frame over which is stretched a canvas or other fabric cover 13. This bed is designed for use within the body of an automobile and is so constructed that it may be supported at each end upon the arm rests of the automobile seats, with the bed being entirely housed within the vehicle in a manner to permit of the use of the side curtains of the vehicle if desired. This provides a snug and comfortable sleeping apartment, which is especially comfortable in wet weather and which in addition, leaves the bed a considerable distance above the ground, so that its occupants will be free from the annoyance of insects. Further, the bed is so constructed that it will be elevated above the back of the front seat of the vehicle so that the back will not interfere with the comfort of the sleepers, while the space between the bed and the seats provides ample storage space for clothing.

In order to permit of the bed being compactly folded, each of the longitudinal bars 11 is formed of a pair of sections which are hingedly connected together. This hinged connection is in the form of side plates 14 which are secured upon each side of each section of the longitudinal bars and are pivotally connected as at 15 at a point beneath the bars, so that the sections may be moved pivotally in one direction, but pivotal movement in an opposite or downward direction prevented. The covering 13 is firmly secured to the bars 11, the side edges of the said covering being secured to the side bars, while the central portion is secured to the center bar, the space upon each side of the latter being sufficient to accommodate a person. In order to permit the cover 13 to properly fold, the said cover is slitted as shown at 16. The bed may be constructed of any desired length, but in order to provide a uniform size which may be used in practically all sizes of automobiles, the cover 13 is transversely slitted near one end as shown at 17, the slit being of sufficient size to permit of the passage of the steering wheel therethrough. This adapts the bed for use within short bodied cars and when used within a car of sufficient length, the slit 17 may be closed by means of an ordinary snap fastener 18.

Detachably connected to the side bars 11 are the cross bars 12, the latter being adjustable so as to fit within vehicles of different widths and to provide for properly stretching the cover 13. For this purpose, the cross bars 12 are formed in separate sections 19 and 20 and the inner ends of these sections overlap and are connected by U-shaped straps 21. The straps 21 are both secured to the section 19, so that the section 20 is slidable within these straps upon the other section. The outer ends of the sections 19 and 20 have secured thereto feet 22. These feet are connected to the lower outer edges of the sections 19 and 20 and are adjustable longitudinally with respect to these sections. For this purpose there is provided bolts 23 which extend downwardly through the ends of the sections 19 and 20 and through the adjacent portions of the feet 22. The latter are provided with spaced openings 24 so as to permit of the bolts 23 being adjustably secured to the feet. In addition, the outer end of each of the sections 19 and 20 has secured thereto a tongue 25, which is adapted to be received within a loop 26 provided at the opposite ends of the outer side bars 11.

Novel means is provided for forming the tongue 25. This consists of bending a metal strip intermediate its ends to provide the tongue, from which extends a shoulder or rest 27 which receives the side bars 11. The loop 26 is secured to the side edge of the bar 11 so that the tongue may be received within the loop with the bar resting upon the shoulder 27. Extending downwardly from the shoulder 27 is a leg 28 which is secured to the end of the cross bar and terminates in a V-shaped extension 29 which extends into a similarly shaped groove 30 provided in the upper edge of the foot 22. By this means the foot 22 may be longitudinally adjusted along the cross bar through the medium of a single bolt, the extension 29 of the foot 28 engaging the walls of the groove 30 so as to prevent pivotal movement of said foot. Also extending downward from the tongue 25 is a leg 31 which is secured to the cross bar by the bolt 23. By means of the construction just described, the bars 11 are spaced above the upper edge of the cross bars and as the latter are elevated by means of the feet 22, the bed will be sufficiently high to pass over the upper edge of the back of the front seat. The central bar 11 is supported at the same elevation as the side bars and to provide for this, a U-shaped member 32 is secured to one of the sections of each of the cross bars.

Pivotally secured to one of the sections of each of the cross bars, for example, the section 20, is one end of a lever 33, the pivotal mounting of which is indicated at 34. This lever is provided with a notched lug 35, which is adapted to engage one of the links of a chain 36, whose opposite end is connected to the section 19 of the cross bar as indicated at 37. When the sections of the cross bars 20 are adjusted, they may be held against relative inward movement by the engagement of the chain 36 with the notched lug 35 and as this lug is carried by the pivotally mounted lever 33, the latter may be swung to a position beneath a keeper 38 to tightly stretch the cover 13 in a transverse direction so as to render the bed comfortable. The keeper 38 consists of an L-shaped metallic member having one end secured to the section 19 of the cross bar and its opposite end extending over the upper edge of said bar for the reception of the free end of the lever 33.

The invention is susceptible of various changes in its form, proportions and minor details of construction and the right is herein reserved to make such changes as properly fall within the scope of the appended claims.

Having described the invention what is claimed is:—

1. A folding bed comprising a frame including longitudinal bars and transverse bars, a fabric covering secured to the longitudinal bars, upwardly extending brackets secured to and extending above the transverse bars, vertically disposed tongues extending upwardly from the brackets, shoulders disposed adjacent the tongues to provide right angularly disposed horizontal seats for receiving the longitudinal bars to support the latter and loops secured to the longitudinal bars to engage the tongues upon the opposite sides of the seats and provide tongue engaging sockets, to connect the transverse and longitudinal bars.

2. A folding bed comprising a frame including longitudinal bars and transverse bars, a fabric covering secured to the longitudinal bars, upwardly extending brackets secured to and extending above the transverse bars, means carried by the brackets for connection with the longitudinal bars, extensible feet secured to the ends of the transverse bars and means forming a part of the brackets to aid in holding the feet in position.

3. A folding bed comprising a frame including longitudinal bars and transverse bars, a fabric covering secured to the longitudinal bars, upwardly extending brackets secured to and extending above the transverse bars, means carried by the brackets for connection with the longitudinal bars, extensible feet secured to the ends of the transverse bars and means extending from the brackets for engagement in grooves formed in the extensible feet, to aid in holding the latter in position.

4. A folding bed including longitudinal bars, transverse bars connecting the longitudinal bars, each of said transverse bars being of sectional formation and having the inner ends of the sections arranged in overlapping engagement, means for connecting the sections to permit of relative sliding movement, a lever pivotally secured to one section, a flexible element having one end secured to the other section, means carried by the lever to permit of adjustable engagement with the flexible element to limit the sliding movement of the sections in one direction, means for detachably securing the longitudinal bars to the transverse bars and a fabric covering secured to the longitudinal bars.

5. In a folding bed, transverse bar members provided at their ends with metal straps, each metal strap having a vertical portion merging into a horizontal portion, said horizontal portion merging into a vertical standard formed of a part of the strap bent upon itself, and said standard merging into a portion which extends downwardly and is secured to the cross bar and a bed body portion having strap metal sockets secured to the inner surfaces of its side rails and engaging said standards.

6. In a folding cot, the combination with a transverse bar, of a foot member carried by one end of said bar and a strap metal leg secured to the same end of said bar and including a vertical portion merging into a horizontal portion, a vertical standard merging into the horizontal portion and formed of a portion of the strap bent upon itself, and a downwardly extending portion merging into the standard and having a foot at its lower end, a tie member extending through said foot, transverse bars and foot extension, and a cot side rail provided with a socket engaging said standard.

In testimony whereof I affix my signature,

BURTON E. CRAIN.